(12) United States Patent
Zweighaft

(10) Patent No.: US 6,186,430 B1
(45) Date of Patent: Feb. 13, 2001

(54) TAPE DRIVE CONNECTION SENSING ASSEMBLY

(75) Inventor: James Zweighaft, Boulder, CO (US)

(73) Assignee: Benchmark Tape Systems Corporation, Boulder, CO (US)

( * ) Notice: Under 35 U.S.C. 154(b), the term of this patent shall be extended for 0 days.

(21) Appl. No.: 09/293,585

(22) Filed: Apr. 16, 1999

(51) Int. Cl.[7] .................................................... G03B 1/58
(52) U.S. Cl. ................... 242/332.4; 242/338; 242/334.2; 242/357; 242/333.7
(58) Field of Search ............................. 242/332.1, 332.2, 242/332.4, 348.2, 336, 338, 357, 333.7, 333.6, 334.2; 360/132, 95, 96

(56) References Cited

U.S. PATENT DOCUMENTS

| | | | |
|---|---|---|---|
| 3,473,042 | * 10/1969 | Orlando | 242/332.1 X |
| 3,764,088 | * 10/1973 | Yamada et al. | 242/332.2 |
| 3,880,382 | * 4/1975 | Jantzen et al. | 242/332.1 |
| 4,502,607 | 3/1985 | Szajna . | |
| 4,502,647 | * 3/1985 | Zweighaft et al. | 242/333.7 X |
| 4,572,460 | 2/1986 | Hertrich . | |
| 4,577,811 | * 3/1986 | Bray et al. | 242/332.1 |
| 4,646,177 | * 2/1987 | Sanford et al. | 242/332.4 X |
| 4,662,049 | 5/1987 | Hertrich . | |
| 4,679,747 | 7/1987 | Smith . | |
| 4,726,542 | * 2/1988 | Nakayama et al. | 242/332.2 |
| 4,776,528 | * 10/1988 | West | 242/332.1 |
| 4,977,474 | 12/1990 | Oishi et al. . | |
| 5,325,249 | * 6/1994 | Butts et al. | 242/332.4 X |
| 5,379,167 | 1/1995 | Robles et al. . | |
| 5,492,284 | * 2/1996 | Sorensen | 242/348.2 |
| 5,557,484 | * 9/1996 | Leonhardt et al. | 242/332.4 X |
| 5,769,346 | 6/1998 | Daly . | |
| 5,793,563 | 8/1998 | Katsuyama et al. . | |
| 5,857,634 | * 1/1999 | Hertrich | 242/338.1 |
| 5,971,310 | 10/1999 | Saliba et al. . | |

* cited by examiner

Primary Examiner—William A. Rivera
(74) Attorney, Agent, or Firm—Duft, Graziano & Forest, P.C.

(57) ABSTRACT

A sensing assembly for use in determining if magnetic tape within a single reel tape cartridge properly connects to a takeup reel within a tape drive during loading of the tape cartridge, so that the magnetic tape can be wound between the tape cartridge and the tape drive as data is transferred to or from the magnetic tape. The sensing assembly comprises at least one sensing apparatus for providing feedback on connection status to prevent connection failures from rendering the tape drive inoperable.

19 Claims, 4 Drawing Sheets

TAPE DRIVE CONNECTION SENSING ASSEMBLY

FIELD OF THE INVENTION

The invention relates to digital tape drive storage devices, and in particular, to the provision in a digital tape drive for determining when a tape cartridge is properly loaded, and more particularly, to a sensing assembly for determining the connection status between magnetic tape within the tape cartridge and a takeup reel within a digital tape drive employing a single reel.

PROBLEM

Digital data is stored on tape drives utilizing a variety of designs, but in all cases, magnetic tape media is wound between a pair of tape reels as data is transferred to or from the tape media. In the art of data storage, the physical space required to store data is an important concern. To conserve space, tape drives often use a single reel tape cartridge design, which utilizes a supply reel located within the tape cartridge and a takeup reel located within the tape drive. After the tape cartridge is inserted into the tape drive, the magnetic tape must be connected to the takeup reel. Various methods have been employed to make this connection. One such method connects the magnetic tape to the takeup reel via a buckle between a tape cartridge leader and a takeup leader as described in U.S. Pat. No. 4,572,460.

The magnetic tape within the tape cartridge is terminated at one end by the tape cartridge leader, which is a strong flexible plastic strip containing an ovular aperture on its distal end. The takeup leader is a similar strong flexible plastic strip attached at one end to the takeup reel. The other end has a stem and tab designed to buckle with the ovular aperture on the tape cartridge leader. When the tape cartridge is inserted into the tape drive, the takeup leader and tape cartridge leader are positioned to buckle together. This system improved on prior art systems employing a combination of vacuum and air pressure to guide the tape through a path, but still results in connection failures due to wear, misalignment or other causes.

In the prior art, connection failures are not always detected by the tape drive. If a connection fails, the takeup leader is free to be drawn into the tape path when the takeup reel is energized. Due to the flexible nature of the takeup leader, it cannot be pushed back out once it has been pulled in, thus rendering the tape drive inoperable. Fixing the tape drive requires removing the drive from its enclosure, disassembly of the drive, and repositioning of the takeup leader. This results in significant downtime and cost for users. In addition, because the connection mechanism wears out over time, the problem of connection failures is most common in high duty cycle applications, where it causes the most damage. For example, in applications such as library tape drive systems, a broken tape results in a load failure. The library then moves the bad tape to a new tape drive, which is in turn rendered inoperable. This process can repeat until the entire system is down.

For these reasons, it is desirable to have a sensing mechanism that detects connection failures and alerts an operator and/or system of the failure, while providing a method of recovery without the need for removal and disassembly of the tape drive unit.

SOLUTION

The present tape drive sensing assembly overcomes the problems outlined above and advances the art by preventing a connection failure in a single reel tape drive from rendering the tape drive inoperable. The sensing assembly prevents connection failures from rendering the tape drive inoperable by determining if magnetic tape within the tape cartridge is properly connected to the takeup reel in the tape drive. More particularly the sensing assembly detects whether the tape cartridge leader is properly connected to the takeup leader. The sensing assembly provides a method for automatically resetting the takeup leader if a connection fails. The sensing assembly comprises a microprocessor and at least one position sensor that detect various movements in the tape drive consistent with specific connection statuses, namely, proper connection and connection failure.

In a first embodiment, a takeup motor energizes the takeup reel to bias the takeup leader on a catch, while the supply reel is allowed to rotate freely. The catch holds the takeup leader as the connection is made. A load motor then rotates the catch from an unloaded position to a loaded position. The torque applied by the takeup motor holds the takeup leader on the catch during rotation of the catch. If the connection is successful, the tape cartridge leader is pulled slightly out of the freely rotating supply reel as the catch rotates. A position sensor detects the movement of the supply reel as a first confirmation of a good buckle. The supply reel is then energized slightly more than the takeup reel in the opposing direction so that the takeup leader is pulled back toward the supply reel and off of the catch. A second position sensor provides a second confirmation that the connection exists by sensing the reverse motion of the takeup leader as the supply reel pulls the takeup leader back and off the catch. If the connection is not confirmed, the takeup leader remains on the catch, and will not move until it is pulled back to the unloaded position with the catch.

In other embodiments, the supply reel is not free to rotate as the catch is rotated to the loaded position. If the connection is made, the takeup leader is held by the tape cartridge leader, and moves only slightly as it releases from the catch during rotation to the loaded position. If the connection is not made, the takeup leader remains on the catch as it rotates, moving the takeup leader further than if the connection was made. The additional movement in the takeup leader is sensed and used to indicate a connection failure. Because the takeup leader remains on the catch, it is not drawn into the drive by the takeup reel, and moves with the catch as it is returned to the unloaded position.

DETAILED DESCRIPTION

The invention summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Prior Art

Figure 1:
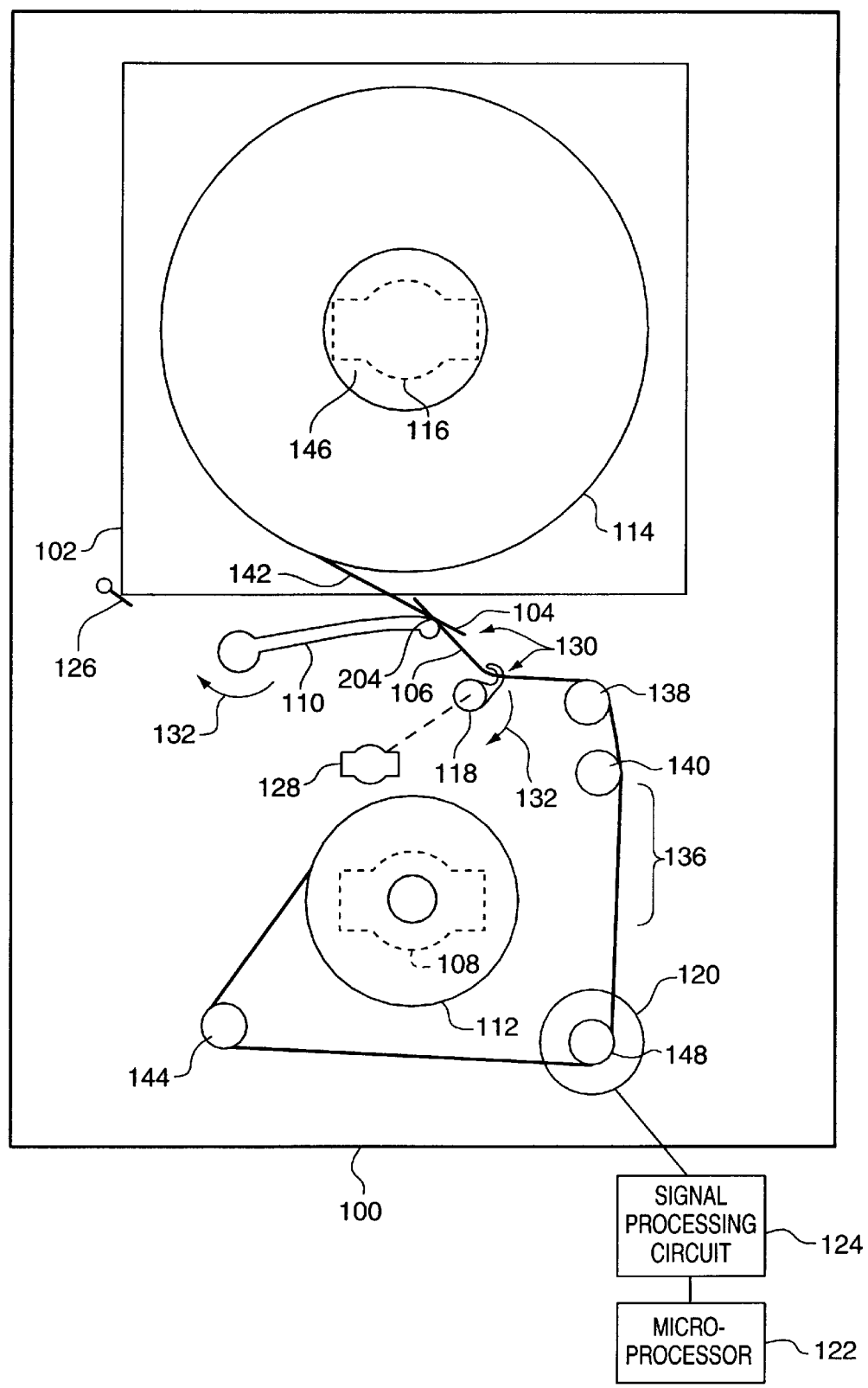
FIG. 1, illustrates a tape drive embodying the sensing assembly of the present invention.

FIG. 1 illustrates tape drive 100 embodying the sensing assembly of the present invention. By way of background, the tape loading operation begins when tape cartridge 102 is inserted into tape drive 100. Tape cartridge 102 houses magnetic tape 142 wound around supply reel 114. Magnetic tape 102 includes a tape cartridge leader 104 connected to its free end. Takeup reel 112 includes a similar takeup leader 106. Takeup leader 106 connects to takeup reel 112 and winds around guide rollers 144, 148, 140, and 138 where it hooks on catch 118.

When tape cartridge 102 is fully inserted into tape drive 100, tape cartridge leader 104 is positioned to connect with takeup leader 106. Positioning lever 110 positions tape cartridge leader 104 and takeup leader 106 for connection. The loading of tape cartridge 102 engages cartridge present switch 126. Microprocessor 122 in response to a signal from cartridge present switch 126 initiates the connection of takeup leader 106 and tape cartridge leader 104. The connection between takeup leader 106 and tape cartridge leader 104 is in the form of a buckle.

Figure 2:
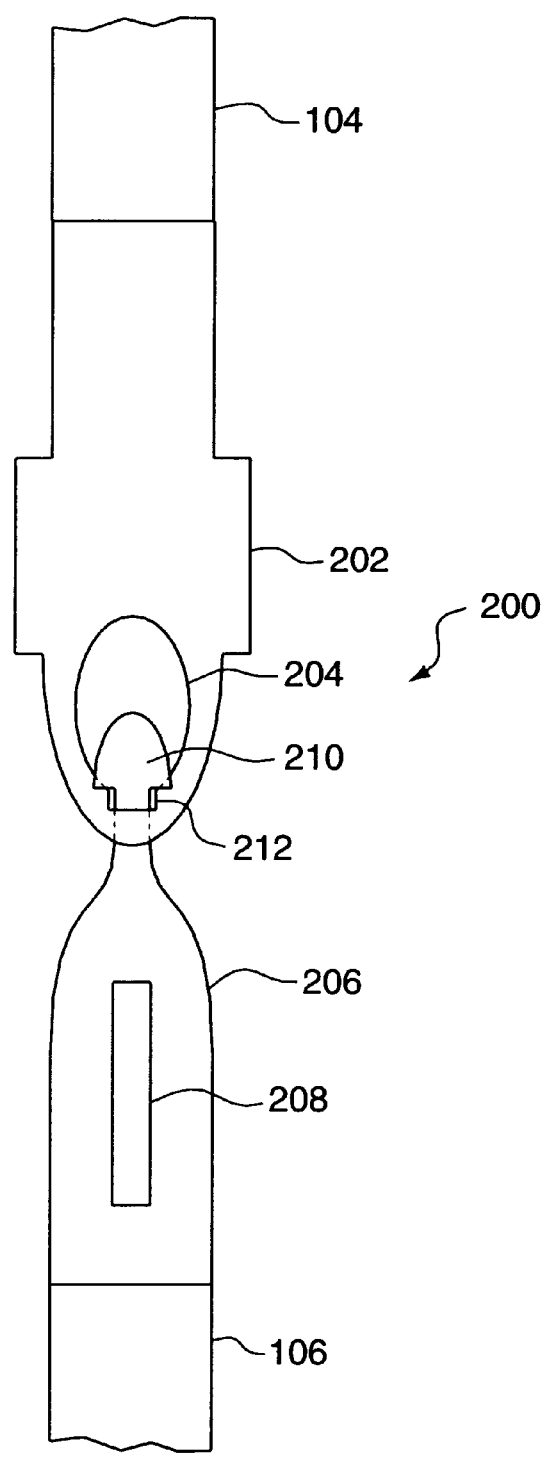
FIG. 2, illustrates a close up perspective view of the connection between the tape cartridge leader and the takeup leader.

FIG. 2 illustrates a close up perspective view of the buckle between tape cartridge leader 104 and takeup leader 106. Tape cartridge leader 104 comprises a first elongated flexible plastic strip 202 containing an ovular aperture 204 defined therein. Takeup leader 106 comprises a similar second elongated flexible plastic strip 206, which contains an integrally formed stem 212 and tab 210 that are proportioned to buckle with ovular aperture 204 as illustrated by FIG. 2. Takeup leader 106 also includes an elongated rectangular slot 208 that is proportioned to hook onto catch 118.

Referring back to FIG. 1, in the unloaded position 130, catch 118 is hooked through slot 208 and positioning lever 110 holds takeup leader 106 so that stem 212 is inserted through aperture 204 when tape cartridge 102 is fully inserted into tape drive 100. Microprocessor 122 responsive to a signal from cartridge present switch 126 rotates catch 118 from unloaded position 130 clockwise to loaded position 132 thereby releasing takeup leader 106. Opposing currents applied to supply motor 116 and takeup motor 108 bias tape cartridge leader 104 and takeup leader 106 to pull in opposing directions completing the buckle. If tape cartridge leader 104 and takeup leader 106 do not buckle properly due to wear, misalignment or other causes, takeup leader 106 may be pulled past catch 118 into tape path 136 and eventually around takeup reel 112. Tape path 136 comprises the path of magnetic tape 142 from its origination on supply reel 114 to its destination on takeup reel 112, including supply motor 116, takeup motor 108, and load motor 128. Tape path 136 also includes positioning lever 110, catch 118, a plurality of guide rollers e.g. 148, 138, 140, and 144, and takeup reel 112.

In the event that a bad connection causes takeup leader 106 to be drawn into tape path 136 without tape cartridge leader 104 attached, takeup reel 112 cannot push takeup leader 106 back into position for a subsequent loading operation, rendering tape drive 100 inoperable. To operate again, tape drive 100 must be removed and disassembled so that takeup leader 106 can be reconnected to catch 118.

Sensing Assembly

The sensing assembly provides feedback to microprocessor 122 on the connection status of magnetic tape 142 and tape drive 100 during the loading of tape cartridge 102. Specifically, the sensing assembly provides feedback on the connection of tape cartridge leader 104 to takeup leader 106 by sensing movement within tape path 136. The amount of movement is used to determine if a connection is made. The sensing assembly prevents a connection failure from rendering tape drive 100 inoperable by resetting takeup leader 106 after the connection failure. Those skilled in the art will appreciate numerous variations in sensing configuration and operation that are within the scope of the present sensing assembly. Those skilled in the art will also appreciate how the principles illustrated in the two embodiments described below can be used in other embodiments of the sensing assembly as well as in other tape drive models that employ various connection methods and apparatus.

The sensing assembly is also beneficial in tape drive models not rendered inoperable by connection failures. The sensing assembly provides immediate feedback with specific problem identification. Advantageously, the principles of the present sensing assembly can be employed to provide feedback on other internal tape drive problems. Specifically, broken leaders, misalignment in the tape path, and frozen reels can easily be detected using the principles of the present sensing assembly.

The major components of the sensing assembly are microprocessor 122, and position sensor 120. In a first embodiment, position sensor 120 is used to detect movement of tape cartridge leader 104 and takeup leader 106 within tape path 136 consistent with either a proper connection or a connection failure. Position sensor 120 provides feedback to microprocessor 122 via signal processing circuit 124. In a second embodiment, two position sensors 120 and 146 detect movements within tape path 136 consistent with either a proper connection or a connection failure. Microprocessor 122 in response to feedback from position sensors 120 and 146 executes operation of tape drive 100, or alerts the system and/or operator of a connection failure.

A connection failure is prevented from rendering tape drive 100 inoperable by preventing takeup leader 106 from being drawn into tape path 136 without tape cartridge leader 104 being attached. During loading, takeup leader 106 is sufficiently biased on catch 118 by energizing takeup reel 112 in a clockwise direction. This prevents takeup leader 106 from releasing even as catch 118 rotates. Takeup leader 106 is not released from catch 118 until feedback consistent with a proper connection is received by microprocessor 122. If feedback consistent with a proper connection is not received, takeup leader 106 remains connected to catch 118 and is reset for subsequent loading when catch 118 is rotated back to unloaded position 130 from loaded position 132.

Microprocessor 122 is a servo microprocessor, and provides the hardware base for controlling the operation of tape drive 100. Position sensors 120 and 146 may be connected to any location where movement of tape cartridge leader 104 and takeup leader 106 can be sensed. Position sensors 120 and 146 are of the type commonly known in the art, one example being an angular position sensor. Microprocessor 122 and signal processing circuit 124 are a conventional circuit and processor configured with software to operate in accord with the various embodiments of the sensing assembly. The software will be apparent to those skilled in the art in the context of the following discussion.

Figure 3:
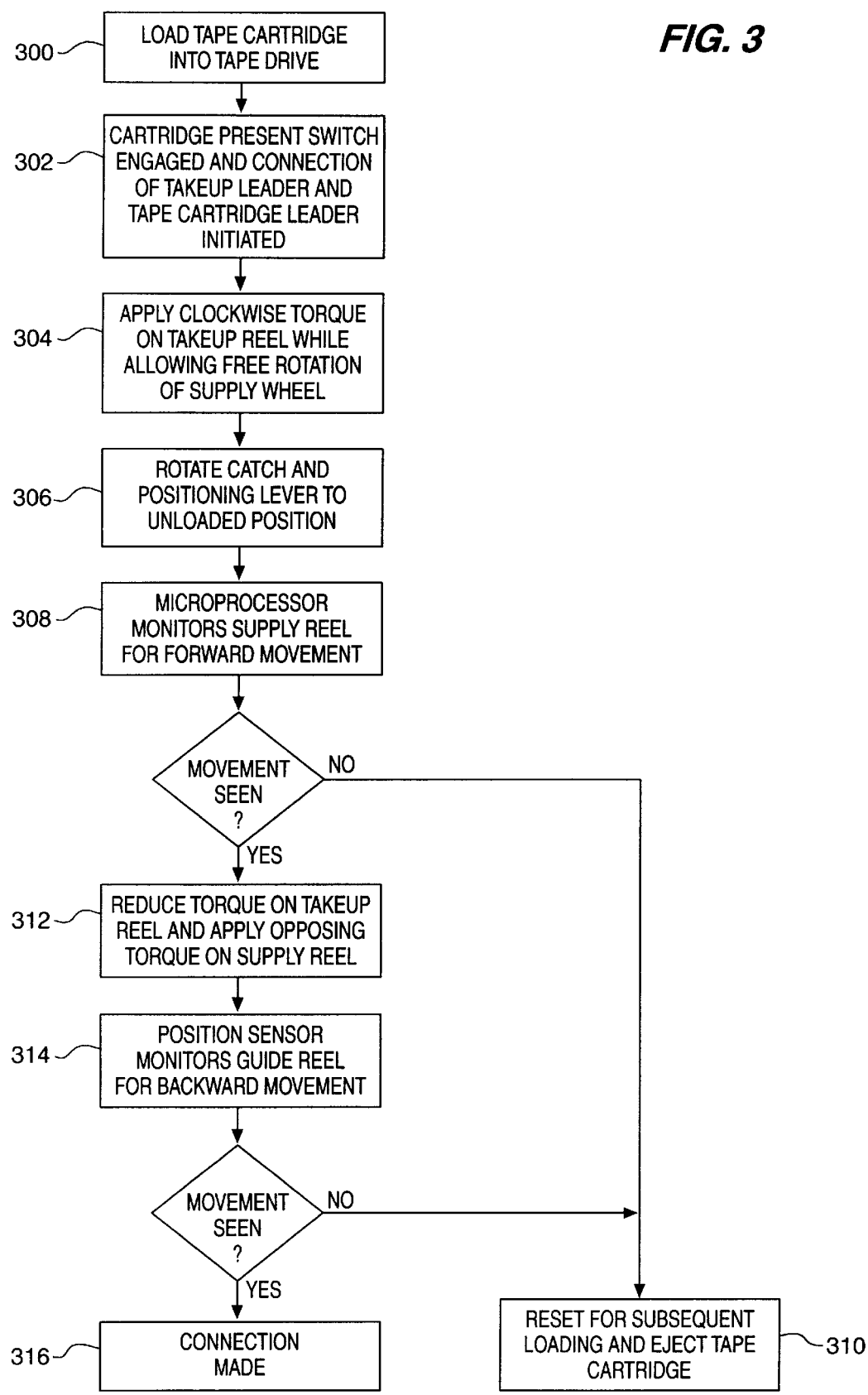
FIG. 3, is a flow diagram of the operating steps in a first embodiment of the sensing assembly.

FIG. 3 is a flow diagram of the operating steps in a first embodiment of the sensing assembly. Tape cartridge 102 is loaded into tape drive 100 at step 300. Loading tape cartridge 102 engages cartridge present switch 126, which initiates the connection of takeup leader 106 and tape cartridge leader 104 at step 302. Microprocessor 122, responsive to a signal from cartridge present switch 126, energizes takeup motor 108 to apply a clockwise torque on takeup reel 112 at step 304. The clockwise torque holds takeup leader 106 firmly on catch 118. Supply motor 116 is not energized at step 304, allowing supply reel 114 to rotate freely. Alternatively, supply motor 116 may be energized only slightly in a counter clockwise direction compared to the stronger clockwise torque on takeup reel 112. The torque on takeup reel 112 biases takeup leader 106 on catch 118.

Microprocessor 122 energizes load motor 128 to rotate catch 118 and positioning lever 110 from unloaded position 130 to loaded position 132 at step 306. If tape cartridge leader 104 and takeup leader 106 properly connect, takeup leader 106 and tape cartridge leader 104 are rotated with catch 118 to loaded position 132. Tape cartridge leader 104 is pulled slightly out of freely rotating supply reel 114 as catch 118 is rotated. If the connection of tape cartridge leader 104 and takeup leader 106 fails, tape cartridge leader 104 remains static and only takeup leader 106 is rotated with catch 118 to loaded position 132.

Microprocessor 122 monitors supply reel 114 for counter clockwise movement via position sensor 146 at step 308. If supply reel 114 remains static, indicating a connection failure, microprocessor 122 resets for subsequent loading operations by rotating catch 118 and positioning lever 110 back to unloaded position 130, and ejecting tape cartridge 102 at step 310. Applying torque on takeup reel 112, at step 304, sufficiently biases takeup leader 106 on catch 118 so that it cannot release without the aid of supply reel 114. Thus, takeup leader 106 is reset to unloaded position 130 with catch 118 and positioning lever 110.

If Microprocessor 122 senses movement of supply reel 114 and takeup leader 106 implying a proper connection, microprocessor 122 reduces the torque on takeup reel 112 and applies an opposing torque on supply reel 114 at step 312. The torque differential is sufficient to rotate supply reel 114 slightly counterclockwise pulling takeup leader 106 back toward supply reel 114 and off of catch 118.

As a second confirmation of a proper connection, position sensor 120 monitors guide roller 148 for backward movement of takeup leader 106 at step 314. Alternatively, any equivalent sensor connected to any one of the guide reels may perform the second confirmation. If the connection is made guide roller 148 moves slightly as takeup leader 106 is pulled back toward supply reel 114 and off of catch 118. If the connection is confirmed, loading is complete and magnetic tape 142 is wound through tape path 136 as data is transferred to or from magnetic tape 142 at step 316. If the connection is not confirmed, microprocessor 122 resets for subsequent loading operations by rotating catch 118 and positioning lever 110 back to unloaded position 130 and ejecting tape cartridge 102 at step 310.

A preferred feature of this embodiment is the second confirmation that a proper connection was made. The second confirmation virtually assures the connection was made since it is essentially impossible for tape cartridge leader 104 to pull takeup leader 106 off of catch 118 without a proper connection.

A second embodiment of the sensing assembly utilizes essentially the same components, namely, microprocessor 122, and position sensor 120 but is functionally distinctive because supply reel 114 is not free to rotate as catch 118 is rotated. As with the first embodiment, takeup leader 106 is prevented from being pulled into tape path 136 by applying counterclockwise torque on takeup reel 112, thus sufficiently biasing takeup leader 106 on catch 118 so that it is not released during connection failure. Similarly, takeup leader 106 is reset to unloaded position 130 with catch 118 and positioning lever 110 after a connection failure.

Figure 4:
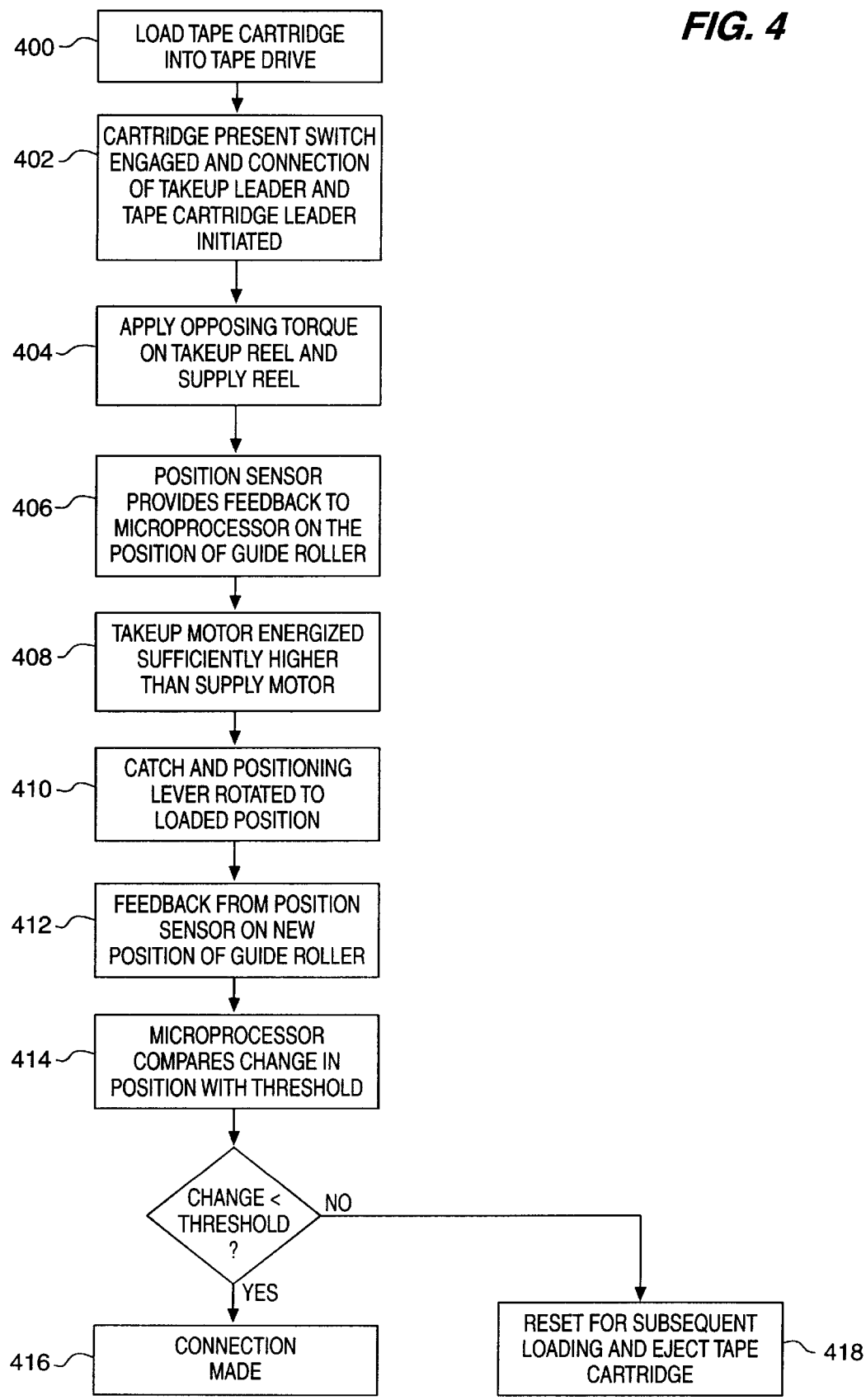
FIG. 4, is a flow diagram of the operating steps in a second embodiment of the sensing assembly.

FIG. 4 is a flow diagram of the operating steps in a second embodiment of the sensing assembly. Tape cartridge 102 is loaded into tape drive 100 at step 400. Similar to the first embodiment, the loading of tape cartridge 102 engages cartridge present switch 126 and initiates the connection of takeup leader 106 and tape cartridge leader 104 at step 402. Microprocessor 122, responsive to a signal from cartridge present switch 126, energizes both takeup motor 108 and supply motor 116 to apply opposing torque on takeup reel 112 and supply reel 114 at step 404. The opposing torque biases takeup leader 106 and tape cartridge leader 104 to make the connection.

Position sensor 120 provides feedback to microprocessor 122 on the angular position of guide roller 148 at step 406. Takeup motor 108 is energized sufficiently more than supply motor 116, at step 408, so that takeup leader 106 remains on catch 118 if the connection fails. Load motor 128 is energized to rotate catch 118 and positioning lever 110 to loaded position 132 at step 410. If a proper connection was made, takeup leader 106 is held back by the connection with tape cartridge leader 104, so that catch 118 is disconnected as it rotates to loaded position 132. Position sensor provides feedback to microprocessor 122 on the new angular position of guide roller 148 at step 412. If the connection is made, the change in position is small because tape cartridge leader 104 holds takeup leader 106 substantially still. If the connection fails, the change in position is greater as takeup leader 106 moves guide roller 148 when takeup leader 106 rotates with catch 118 to loaded position 132. In either scenario some movement is seen by position sensor 120 because takeup leader 106 tends to straighten out as it is put under tension by the opposing torque applied to takeup reel 112 and supply reel 114.

Microprocessor 122 compares the change in angular position of guide roller 148 with a threshold to determine if the connection was made at step 414. If the change in position is smaller than the threshold, indicating a proper connection, loading is complete and magnetic tape 142 is wound through the tape path as data is transferred to or from magnetic tape 142 at step 416. If the change in position is greater than the threshold, indicating a failed connection, microprocessor 122 resets for subsequent loading operations by rotating catch 118 and positioning lever 110 back to unloaded position 130 and ejecting tape cartridge 102 at step 418.

A preferred feature of both embodiments is timely feedback on connection status. The ejection of tape cartridge 102, following a connection failure, alerts operators of connection problems. Operators may then remove the tape cartridge for inspection or can initiate another attempt at loading. Alternatively, in both embodiments, microprocessor 122 may be programmed to alert operators by providing a visual and/or audio message. Microprocessor 122 may also be programmed for various other responses, including but not limited to performing a pre-programmed number of connection attempts before alerting the operator of the connection failure, or alerting a system of a connection failure so that backup apparatuses may be employed.

As to alternative embodiments, those skilled in the art will appreciate that the present sensing assembly may be utilized to detect numerous variables within tape drive 100 that indicate connection status. In addition, the present sensing assembly may be located internal or external to tape path 136 and may be used to detect variables internally or externally to tape path 136 that indicate connection status.

It is apparent that there has been described, a sensing assembly for determining if magnetic tape in a tape cartridge is properly connected to a tape drive, that fully satisfies the objects, aims, and advantages set forth above. While the sensing assembly has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A sensing assembly in a tape drive employing a single reel equipped with a takeup leader for interconnecting with a magnetic tape located in a tape cartridge, for use in determining if the magnetic tape within the tape cartridge connects to the takeup leader during loading of the tape cartridge, so that the magnetic tape can be wound through a tape path between the tape cartridge and the single reel as data is transferred to or from the magnetic tape, comprising:

means for connecting the takeup leader to the magnetic tape for winding the magnetic tape through the tape path;

means for preventing a connection failure from rendering the tape drive inoperable, and at least one means for detecting movement of at least one of the magnetic tape and the takeup leader, wherein the at least one means for detecting provides feedback to a microprocessor responsive to movement of at least one of the magnetic tape and the takeup leader, and wherein the movement is used to determine if the magnetic tape connects to the takeup leader.

2. The sensing assembly as set forth in claim 1, wherein the at least one means for detecting is located internal to the tape path.

3. The sensing assembly as set forth in claim 1, wherein the at least one means for detecting is located external to the tape path.

4. The assembly set forth in claim 1, including a connection capable of being formed by a tape cartridge leader having a first elongated flexible strip with an ovular aperture defined therein and the takeup leader having a second elongated flexible strip with an integrally formed stem and tab, further comprises:

means for positioning the tape cartridge leader and the takeup leader to form the connection;

means for winding the magnetic tape internally within the tape drive;

means responsive to the winding means for unwinding the magnetic tape from the tape cartridge;

at least one means between the winding means and the unwinding means for guiding the magnetic tape through the tape path; and the at least one means for detecting is integrally connected to at least one of the positioning means, winding means, unwinding means, and guiding means.

5. The assembly set forth in claim 4, wherein the positioning means comprises:

a load motor connected to the tape drive;

a rotating positioning lever connected to the load motor, and a rotating catch connected to the load motor.

6. The assembly set forth in claim 4, wherein the winding means comprises:

a takeup motor connected to the tape drive; and a takeup reel connected to the takeup motor.

7. The assembly set forth in claim 4, wherein the unwinding means comprises:

a supply motor connected to the tape drive; and a supply reel connected to the tape cartridge, the supply reel being configured to detachably connect to the supply motor when the tape cartridge is loaded in the tape drive.

8. The sensing assembly set forth in claim 7, wherein the at least one means for detecting comprises:

a position sensor connected to one of the supply motor and the supply reel, the position sensor being responsive to movement of one of the supply motor and the supply reel.

9. The assembly set forth in claim 4, wherein the guiding means comprises:

a plurality of guide rollers connected to the tape drive.

10. The sensing assembly set forth in claim 9, wherein the at least one means for detecting comprises:

a position sensor connected to at least one of the plurality of guide rollers, the position sensor being responsive to movement of the at least one of the plurality of guide rollers.

11. A method for determining if a magnetic tape within a tape cartridge connects to a tape drive, the tape drive employing a single reel equipped with a takeup leader for interconnecting with the magnetic tape so that the magnetic tape can be wound through a tape path between the tape cartridge and the single reel, comprising the steps of:

(a) sensing movement of the takeup leader and the magnetic tape within the tape path;

(b) using the movement to determine if the magnetic tape is connected to the takeup leader;

(c) executing operation of the tape drive responsive to a determination that the magnetic tape is properly connected to the takeup leader; and (d) resetting the tape drive for a subsequent loading operation responsive to a determination that the connection failed.

12. The method of claim 11, wherein the movement sensing step further comprises the steps of:

applying opposing torque on a supply reel and a takeup reel to connect a tape cartridge leader and the takeup leader;

sensing an initial position of a guide roller;

applying additional torque to the takeup reel; and rotating a catch from an unloaded position to a loaded position.

13. The method of claim 12, wherein the movement using step comprises the steps of:

determining a change in position of the guide roller after the catch is rotated to the loaded position; and comparing the position change with a threshold to determine if the tape cartridge leader and the takeup leader are connected.

14. The method of claim 11, wherein the movement using step comprises the steps of:

applying a torque on a takeup reel;

allowing free rotation of a supply reel;

rotating a catch from an unloaded position to a loaded position;

sensing movement of the supply reel;

using the sensed movement to determine if a connection was made;

responsive to a determination that a connection was made, applying opposing torque on the supply reel while reducing torque on the takeup reel; and responsive to a determination that a connection was made, sensing movement of a guide roller to further confirm that a connection was made.

15. The method of claim 11, further comprising the step of:

responsive to a determination that the connection failed, alerting an operator of a connection failure.

16. The method of claim 15, wherein the operator alerting step comprises the step of:

ejecting the tape cartridge from the tape drive.

17. The method of claim 15, wherein the operator alerting step comprises the step of:

providing a visual message on a display.

18. The method of claim 15, wherein the operator alerting step comprises the step of:

providing an audio message.

19. The method of claim 17, further comprising the steps of:

repeating steps (a) through (d) a predetermined number of times responsive to the determination that the connection failed.

* * * * *